US012759234B2

(12) United States Patent
Zhao et al.

(10) Patent No.: US 12,759,234 B2
(45) Date of Patent: Oct. 13, 2026

(54) THREE-DIMENSIONAL PRINTING SYSTEM

(71) Applicant: NISSAN NORTH AMERICA, INC., Franklin, TN (US)

(72) Inventors: Nanzhu Zhao, Novi, MI (US); Federico Venturi, Sugar Land, TX (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 360 days.

(21) Appl. No.: 18/395,063

(22) Filed: Dec. 22, 2023

(65) Prior Publication Data

US 2025/0205968 A1 Jun. 26, 2025

(51) Int. Cl.

| | |
|---|---|
| ***B29C 64/379*** | (2017.01) |
| ***B29C 64/124*** | (2017.01) |
| ***B29C 64/188*** | (2017.01) |
| ***B29C 64/194*** | (2017.01) |
| ***B29C 64/245*** | (2017.01) |
| ***B29C 64/255*** | (2017.01) |
| ***B29C 64/264*** | (2017.01) |
| ***B29C 64/357*** | (2017.01) |
| ***B33Y 30/00*** | (2015.01) |
| ***B33Y 40/20*** | (2020.01) |

(52) U.S. Cl.

CPC .......... *B29C 64/379* (2017.08); *B29C 64/124* (2017.08); *B29C 64/188* (2017.08); *B29C 64/194* (2017.08); *B29C 64/245* (2017.08); *B29C 64/255* (2017.08); *B29C 64/264* (2017.08); *B29C 64/357* (2017.08); *B33Y 30/00* (2014.12); *B33Y 40/20* (2020.01)

(58) Field of Classification Search

CPC ............................ B29C 64/194; B29C 64/379

See application file for complete search history.

(56) References Cited

U.S. PATENT DOCUMENTS

| | | | |
|---|---|---|---|
| 9,808,992 | B1 | 11/2017 | Linnell et al. |
| 10,507,548 | B2 | 12/2019 | Bol |
| 10,987,869 | B2 | 4/2021 | Linnell et al. |

(Continued)

FOREIGN PATENT DOCUMENTS

| | | | |
|---|---|---|---|
| CN | 112590213 | A | 4/2021 |
| CN | 216182839 | U | 4/2022 |

(Continued)

OTHER PUBLICATIONS

Johnball2014, Super Air Wipes Cleaning Rubber Cables, May 6, 2022.

Heat Station Induction Coils, 2018 Magneforce, Inc.

*Primary Examiner* — Timothy Kennedy

(74) *Attorney, Agent, or Firm* — Spencer Fane LLP

(57) ABSTRACT

A three-dimensional printing system includes a tank containing a liquid photopolymer resin, a rigid base on which an object is configured to be printed, and an arm connected to the rigid base to move the rigid base relative to the tank. A first light source is configured to emit light to the tank to form the object on the rigid base. A first pair of rollers are configured to receive the object therebetween. The first pair of rollers are configured to pull the object in a direction out of the tank. A first post-processing station is configured to receive a first end of the object while a second end of the object is being formed in the tank.

14 Claims, 11 Drawing Sheets

(56) References Cited

U.S. PATENT DOCUMENTS

| | | | | |
|---|---|---|---|---|
| 11,660,814 | B2 | 5/2023 | Van Esbroeck et al. | |
| 2015/0076732 | A1* | 3/2015 | Kemmer | B29C 64/118 425/375 |
| 2015/0165695 | A1 | 6/2015 | Chen et al. | |
| 2017/0036783 | A1* | 2/2017 | Snyder | B64G 1/1078 |
| 2017/0217100 | A1* | 8/2017 | Gardiner | B29C 64/209 |
| 2017/0259507 | A1* | 9/2017 | Hocker | B29C 64/245 |
| 2017/0274601 | A1* | 9/2017 | Dunne | B33Y 30/00 |
| 2018/0169940 | A1* | 6/2018 | Dunne | B33Y 30/00 |
| 2018/0311739 | A1* | 11/2018 | O'Brien | B33Y 30/00 |
| 2020/0269373 | A1* | 8/2020 | Pieger | B22F 10/28 |

FOREIGN PATENT DOCUMENTS

| | | | | | |
|---|---|---|---|---|---|
| DE | 102018127451 | A1 | * | 5/2020 | B29C 64/129 |
| DE | 102018127581 | A1 | * | 5/2020 | B33Y 10/00 |
| GB | 2597240 | A | * | 1/2022 | B33Y 70/00 |

* cited by examiner

THREE-DIMENSIONAL PRINTING SYSTEM

BACKGROUND

Technical Field

The present disclosure generally relates to a three-dimensional printing system. More specifically, the present disclosure relates to a three-dimensional printing system in which a first end of an object is configured to be delivered to a post-processing station while a second end of the object is being formed in the tank.

Background Information

Three-dimensional (3D) printing is the construction of a three-dimensional object from a digital file, such as a CAD model or a digital 3D model. The objects are printed layer by layer by the 3D printing system by curing portions of a light curable photopolymer resin layer by layer, one layer at a time, within a printing area of a tank filled with the photopolymer resin. A curing device, such as an ultraviolet light source, is projected through a transparent substrate or bottom wall of the tank curing each layer of the object on a build plate that is at least partially submerged within the photopolymer resin. The build plate is incrementally raised upward as each layer is cured thereon.

A printable length of the object formed by the three-dimensional printing system is limited by a travel distance of a linear motion stage that moves the build plate.

SUMMARY

A need exists for an improved three-dimensional printing system in which a printable length of the formed object is not limited by the travel distance of the linear motion stage, such that longer objects can be printed.

In view of the state of the known technology, one aspect of the present disclosure is to provide a three-dimensional printing system. A tank contains a liquid photopolymer resin. An object is configured to be printed on a rigid base. An arm is connected to the rigid base to move the rigid base relative to the tank. A first light source is configured to emit light to the tank to form the object on the rigid base. A first pair of rollers are configured to receive the object therebetween. The first pair of rollers are configured to pull the object in a direction out of the tank. A first post-processing station is configured to receive a first end of the object while a second end of the object is being formed in the tank.

Also other objects, features, aspects and advantages of the disclosed replenishment system for a three-dimensional printing system will become apparent to those skilled in the art from the following detailed description, which, taken in conjunction with the annexed drawings, discloses exemplary embodiments of the replenishment system for a three-dimensional printing system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
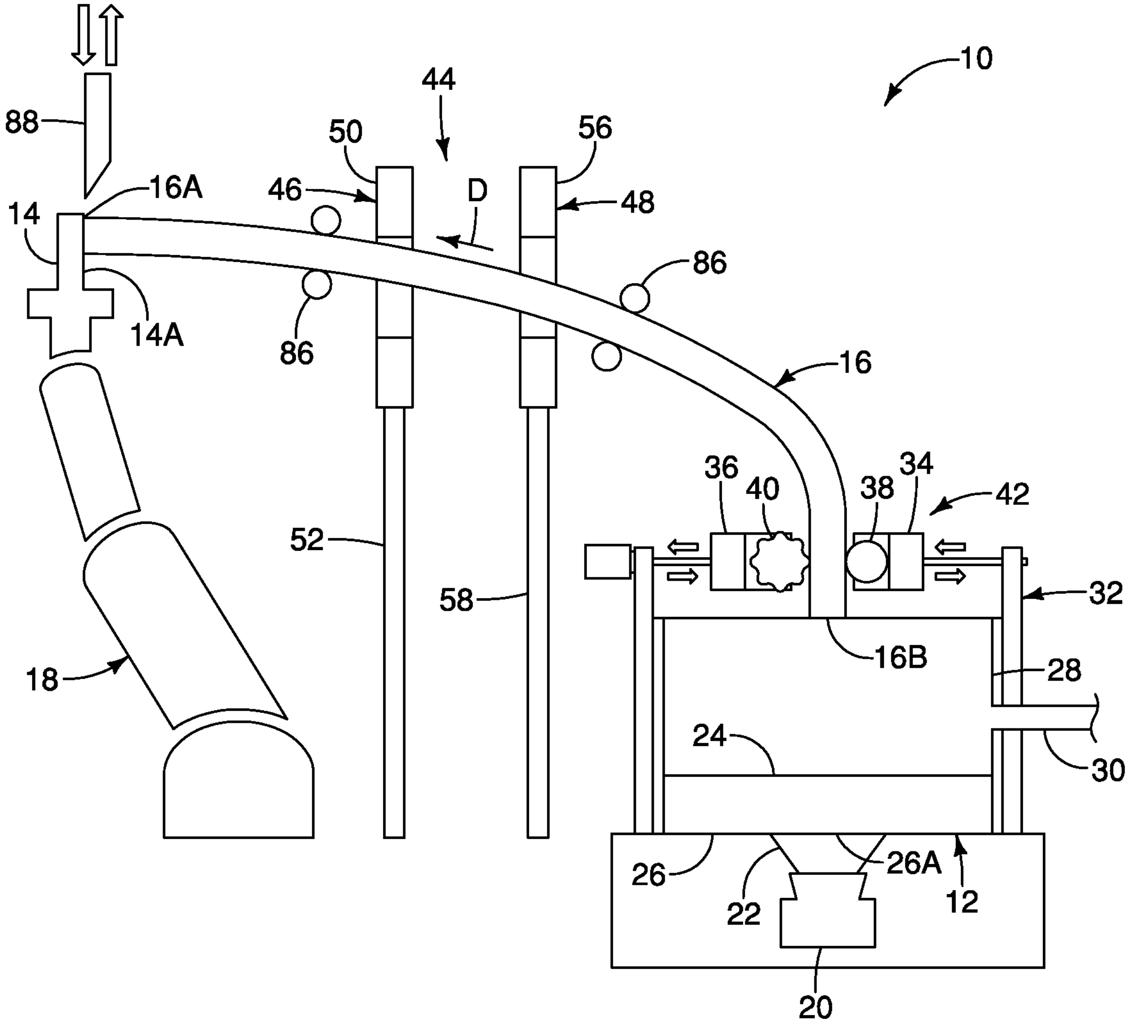
FIG. 1 is a schematic diagram of a three-dimensional printing system in accordance with an exemplary embodiment.

Referring initially to FIG. 1, a 3D printing system 10 in accordance with an exemplary embodiment includes a tank 12. The 3D printing system 10 further includes a rigid base, or build plate, build platform or print bed, 14 on which an object 16 is to be printed and a control arm 18 connected to the rigid base 14.

The rigid base 14 has a print surface 14A on which the object 16 is configured to be printed, as shown in FIG. 1. The control arm 18 is connected to the rigid base 14 to move the rigid base 14 relative to the tank 12. A light source 20 is configured to emit light 22 to the tank 12 to form the printed object 16 on the rigid base 14.

The tank 12 contains a liquid photopolymer resin 24, as shown in FIG. 1. The tank 12 can be any suitable shape to hold the liquid polymer resin 24 therein, such as rectangular or circular. The tank 12 has a base 26 and a side wall 28 extending upwardly from the base 26. The base 26 is preferably transparent such that the light 22 emitted from the light source 20 can pass through the base 26. The entirety of the base 26 can be transparent, or a portion of the base 26 can be transparent. The transparent portion of the base 26 constitutes an optically transparent window 26A through which the emitted light 22 can pass. A pipe 30 can be connected to the tank 12 to supply additional liquid photopolymer resin to the tank 12 to allow for longer objects to be printed.

The rigid base 14 provides the print surface 14A on which the object 16 is printed. The print surface 14A is preferably a planar surface, as shown in FIG. 1. The rigid base 14 can be made of any suitable material, such as plastic, such as polyactic acid (PLA), or glass.

The control arm 18 is connected to the rigid base 16 to control movement and positioning of the rigid base 14 during the printing process. The control arm 18 is connected to the rigid base 14 to move the rigid base 14 relative to the tank 12. The control arm 18 preferably has six degrees of freedom, such that the rigid base 14 can move through a curvilinear path to more accurately print the object 16. The control arm 18 is preferably a robotic arm having six degrees of freedom. The six degrees of freedom are movements along the three axes (i.e., the X, Y and Z axes), and rotation about each of the three axes (i.e., pitch, roll and yaw). Providing the control arm 18 with multiple degrees of freedom, such as six degrees of freedom, allows the control arm 18 to move the rigid base 14 through a curvilinear path, including moving the rigid base 14 to a plurality of positions, thereby allowing a more accurate and intricate object 16 to be printed.

The liquid polymer resin 24 is selectively cured by light-activated polymerization, such as by photopolymerization, which preferably uses visible or UV light, although light having any suitable wavelength can be used, to form in situ cross-linked polymer structures. The liquid polymer resin 24 preferably includes monomer and oligomer molecules that are converted to solid polymers during photopolymerization when the light 22 emitted by the light source 20 is guided through the transparent portion, or the optically transparent window 26A, of the base 26 of the tank 12.

The light source 20 emits light 22 to cure the liquid polymer resin 24 in the tank 12, as shown in FIG. 1. The light source 20 preferably emits UV light 22 having a wavelength between approximately 10 and 400 nanometers, inclusive. Preferably, the emitted UV light 22 has a wavelength between approximately 380 and 400 nanometers, inclusive. Light having any suitable wavelength can be used, such as, but not limited to, UV, visible and infrared light.

A frame, such as a gantry system, 32 surrounds the tank 12, as shown in FIG. 1. The frame 32 includes a first arm 34 and a second arm 36 that are movable relative to the tank 12. The first and second arms 34 and 36 can be received by support rods, such as screws, 32A and 32B to facilitate movement of the first and second arms 34 and 36. A first roller 38 is connected to the first arm 34. The first roller 38 is preferably circular in cross section, but can have any suitable cross sectional shape. A second roller 40 is connected to the second arm 36. The second roller 40 is preferably octagonal in cross section, but can have any suitable cross sectional shape. The first roller 38 and the second roller 40 constitute a first pair of rollers 42. The first pair or rollers 42 are disposed externally of the tank 12. The first pair of rollers 42 are configured to receive the printed object 16 therebetween.

Figure 2:
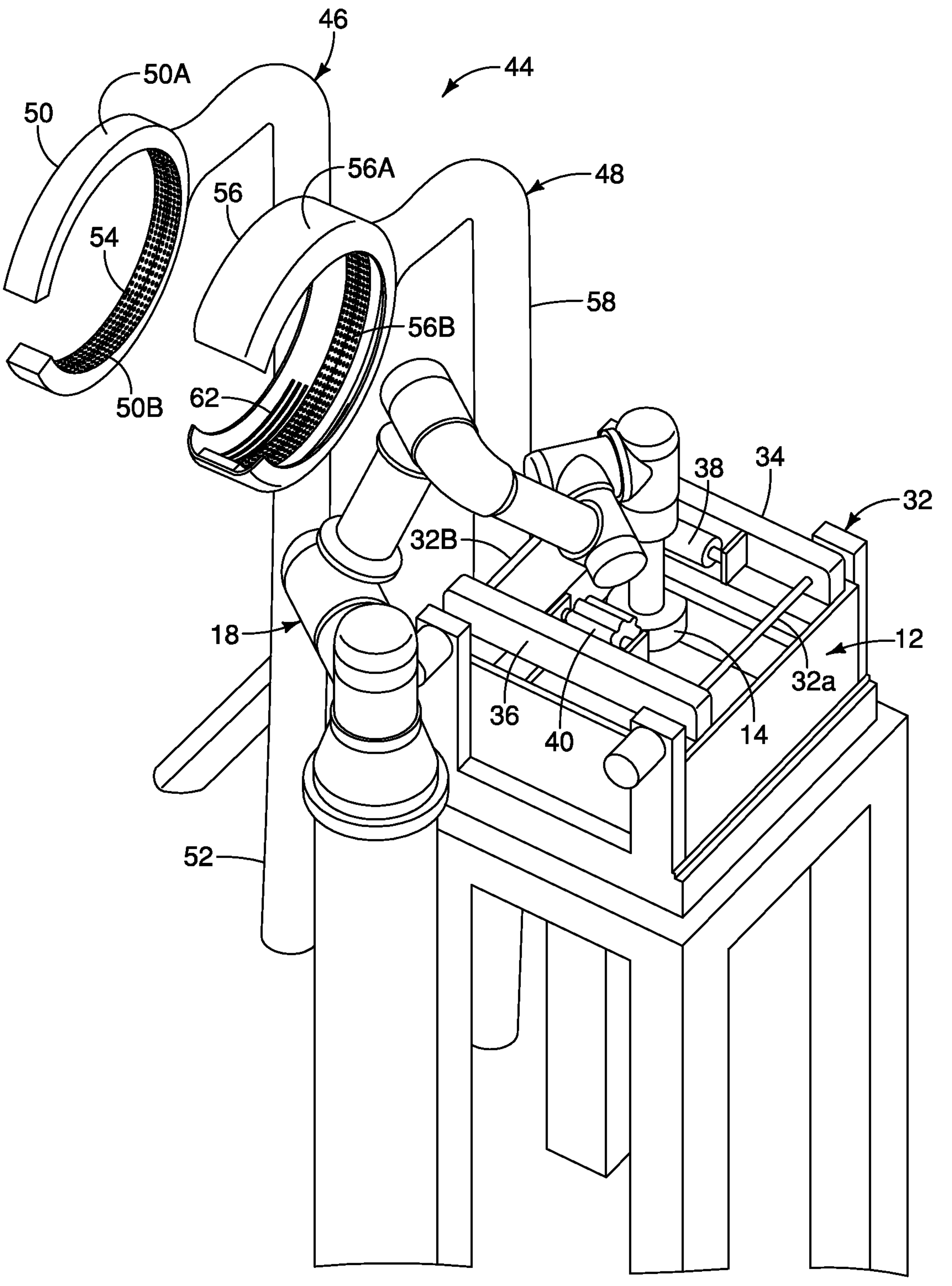
FIG. 2 is a perspective of the three-dimensional printing system of FIG. 1.
Figure 3:
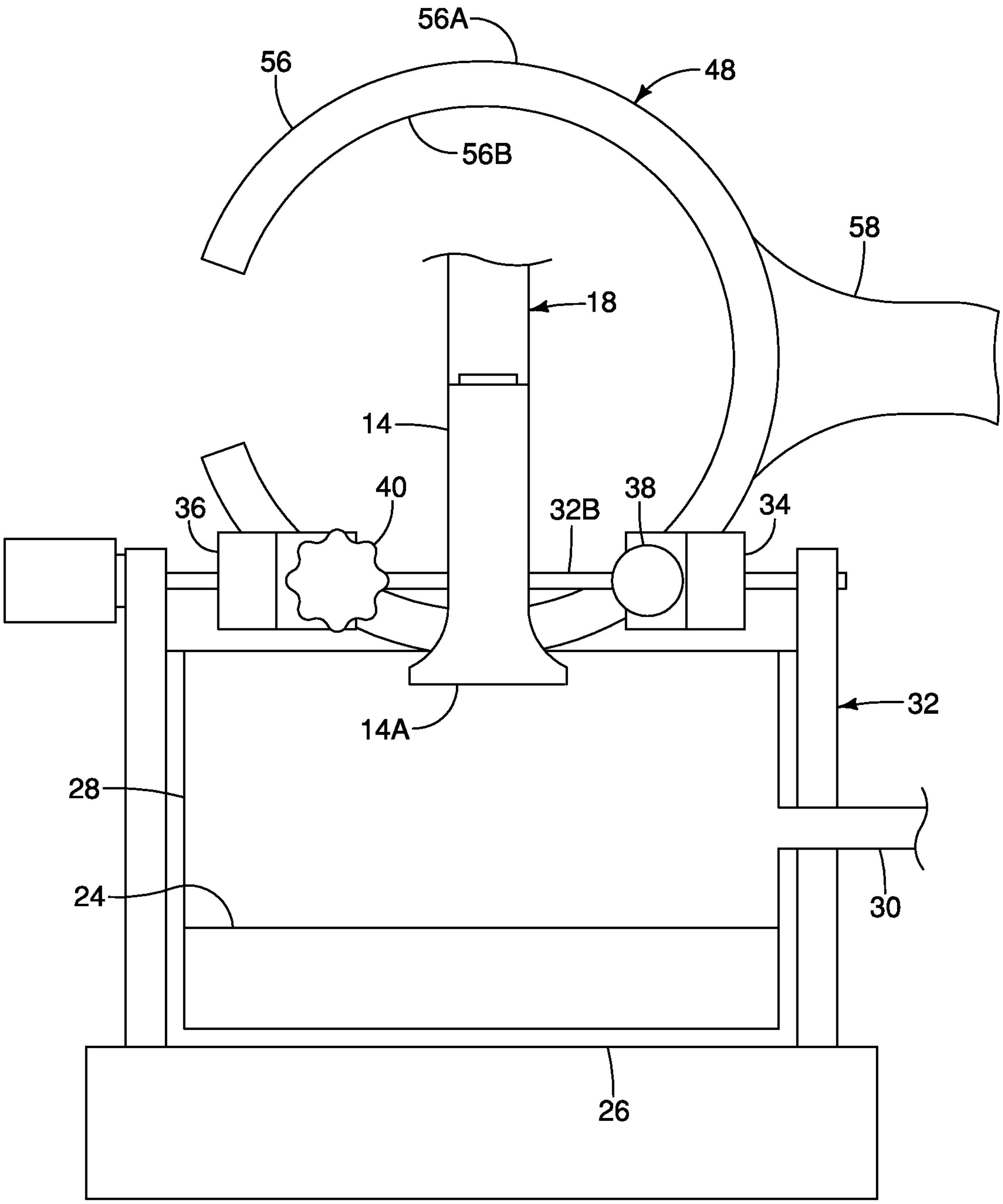
FIG. 3 is an elevational view of the three-dimensional printing system of FIG. 1.

As shown in FIGS. 1-3, the first arm 34 and the second arm 36 of the frame 32 are configured to move toward and away from one another. The first arm 34 and the second arm 36 are moved away from one another to allow the rigid base 14 to be disposed in the liquid photopolymer resin 24 in the tank 12 to begin forming an object thereon, as shown in FIGS. 2 and 3. The light 22 is emitted through the transparent window 26A of the tank 12 to solidify the liquid photopolymer resin 24 layer by layer and attached to the rigid base 14. The first end 16A of the printed object 16 is attached to the print surface 14A of the rigid base 14. The second end 16B of the printed object 16 is the most recently added layer formed on the printed object 16. When the control arm 18 moves the rigid base 14 to a position above the first pair of rollers 42 during formation of the printed object 16 on the rigid base 14, as shown in FIG. 1, the first arm 34 and the second arm 36 are moved toward one another such that the printed object 16 is supported between the first roller 38 and the second roller 40.

One of the first roller 38 and the second roller 40 can be controlled by a motor to be a driven roller. The other of the first roller 38 and the second roller 40 is a driven roller. Preferably, the second roller 40 is the drive roller, and the first roller 38 is the driven roller. The drive roller is driven at a speed to match the printing speed at which the successive layers are added to the printed object 16. The first pair of rollers 42 are configured to pull the printed object 16 in a printing direction D out of the tank 12, as shown in FIG. 1. The control arm 18 controls the rigid base 14 to move at the same speed as the printing speed at which the successive layers are added to the printed object 16.

Figure 4:
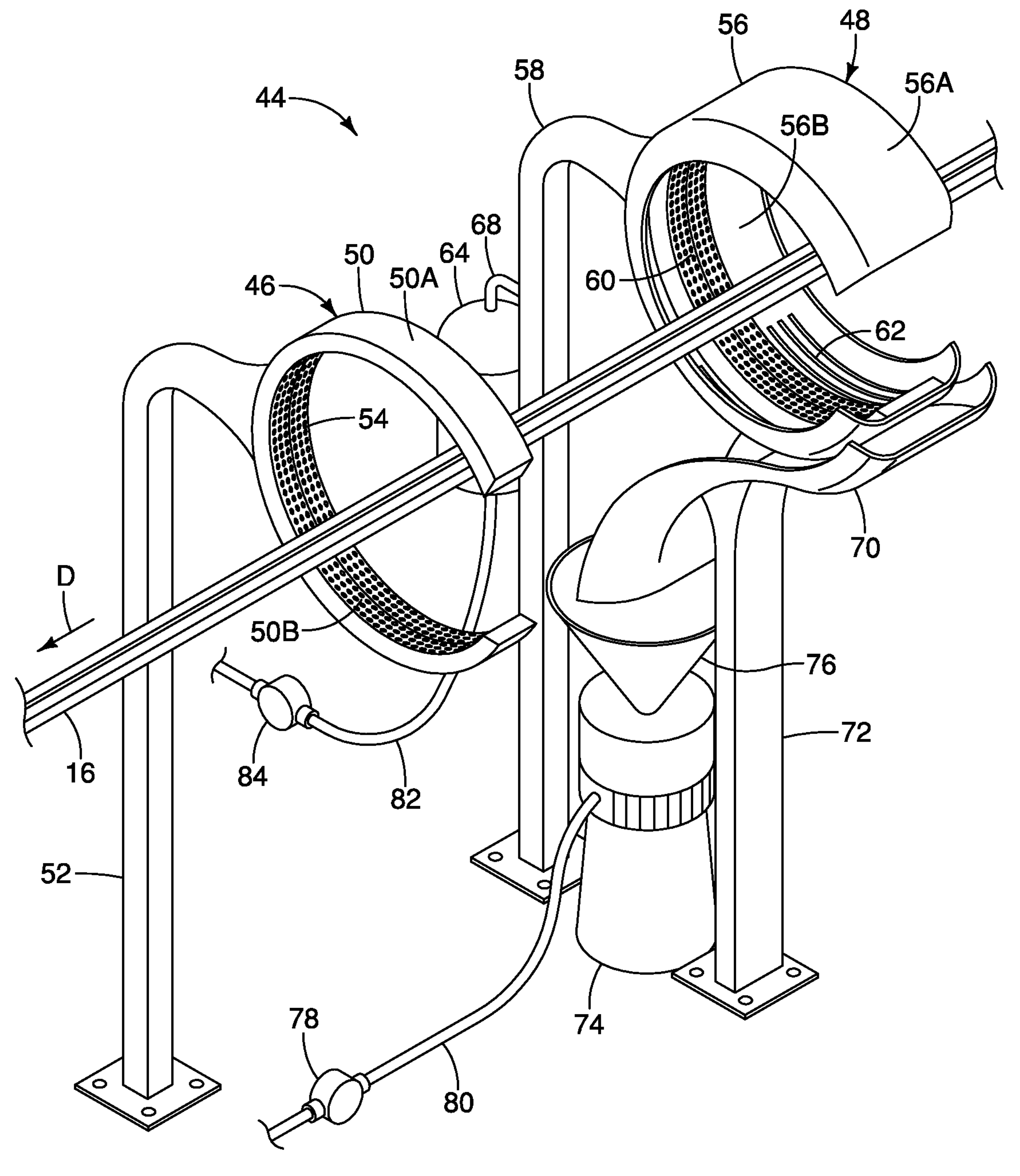
FIG. 4 is a perspective view of first and second post-processing stations of the three-dimensional printing system of FIG. 1.

The printed object 16 is guided to post-processing stations 44, as shown in FIGS. 1-7. The 3D printing system 10 can include any suitable number of post-processing stations 44. As shown in FIGS. 1, 2 and 4, the 3D printing system 10 includes a first post-processing station 46 and a second post-processing station 48. The post-processing stations 44 further process the printed object 16 after the printed object 16 is removed from the tank 12, such as washing and curing the printed object. As shown in FIG. 1, the printed object 16 passes through the first post-processing station 46 and the second post-processing station 48 while the printed object 16 is still being formed in the tank 12. In other words, the first post-processing station 46 is configured to receive the first end 16A of the printed object 16 while the second end 16B of the printed object is being formed in the tank 12, as shown in FIG. 1. The first post-processing station 46 is preferably a curing station, and the second post-processing station 48 is preferably a washing station. The second post-processing station 46 is preferably disposed upstream of the first post-processing station 46 in a printing direction D of the printed object 16, as shown in FIG. 4, although the post-processing stations can be disposed in any order and can include any desired number of post-processing stations, such as one or more post-processing stations.

The first post-processing station 46, as shown in FIGS. 1, 2, 4 and 7, is a post-curing station configured to further cure the printed object 16 externally of the tank 12. Post-curing facilitates the polymerization process to ensure the resin of the printed object 16 is fully cured. The first post-processing station 46 includes a substantially C-shaped frame 50 connected to a stand 52. The stand 52 is configured to be secured to a floor or other suitable surface. The substantially C-shaped frame 50 includes an outer surface 50A and an inner surface 50B.

Figure 7:
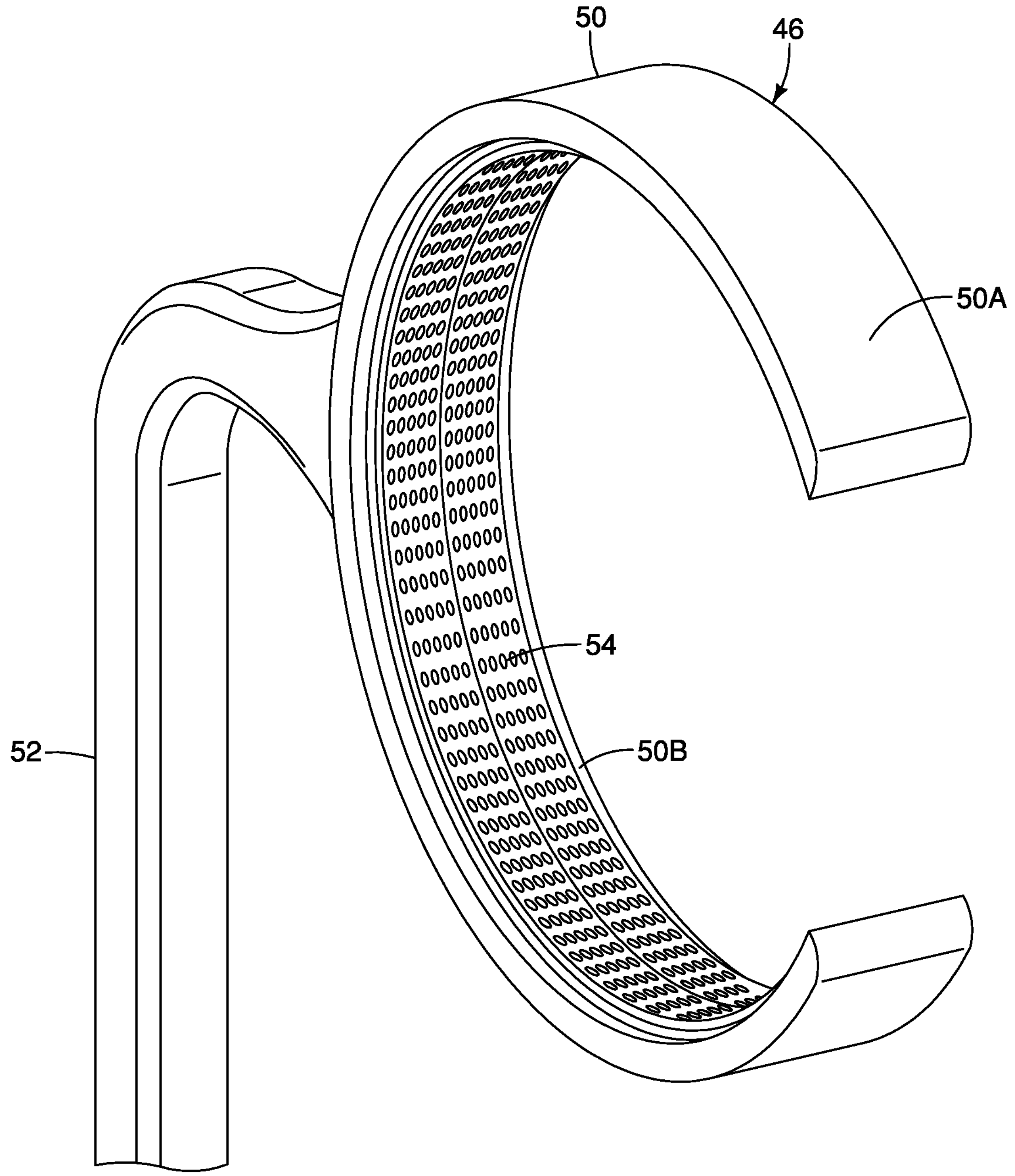
FIG. 7 is a perspective view of a second post-processing station of the three-dimensional printing system of FIG. 1.

The first post-processing station 46 includes a second light source 54 configured to emit light to the printed object 16, as shown in FIGS. 1, 2, 4 and 7. The second light source 54 is disposed on the inner surface 50B of the substantially C-shaped frame 50. As shown in FIGS. 4 and 7, a plurality of second light sources 54 can be disposed on the inner surface 50B of the substantially C-shaped frame 50. Preferably, the second light sources 54 cover a majority of the inner surface 50B of the substantially C-shaped frame 50. A power cable can be run through the stand 52 to supply power to the second light source 54. The second light source 54 can emit any suitable light, such as visible or UV light, to post-cure the printed object 16. The second light source 54 preferably emits UV light having a wavelength between approximately 10 and 400 nanometers, inclusive. Preferably, the emitted UV light by the second light source 54 has a wavelength between approximately 380 and 400 nanometers, inclusive. The second light source 54 can emit light having any suitable wavelength, such as, but not limited to, UV, visible and infrared light.

The second post-processing station 48, as shown in FIGS. 1-6, is a post-washing station configured to wash the printed object 16 externally of the tank 12. Post-washing removes any residual, uncured resin from the printed object 16. The second post-processing station 48 includes a substantially C-shaped frame 56 connected to a stand 58. The stand 58 is configured to be secured to a floor or other suitable surface. The substantially C-shaped frame 56 includes an outer surface 56A and an inner surface 56B. The second post-processing station 48 is configured to receive the first end 16A of the printed object 16 while the second end 16B of the printed object is being formed in the tank 12, as shown in FIG. 1.

The second post-processing station 48 includes a nozzle 60 configured to dispense a liquid to the printed object 16, as shown in FIGS. 1-6. The nozzle 60 is disposed on the inner surface 56B of the substantially C-shaped frame 56. Preferably, a plurality of nozzles 60 are disposed on the inner surface 56B of the substantially C-shaped frame 56. As shown in FIG. 4, the inner surface 56B has a middle portion and two outer portions. The plurality of nozzles 60 are disposed in the middle portion of the inner surface 56B. Preferably, the plurality of nozzles 60 cover a majority of the middle portion of the inner surface 56B.

Figure 5:
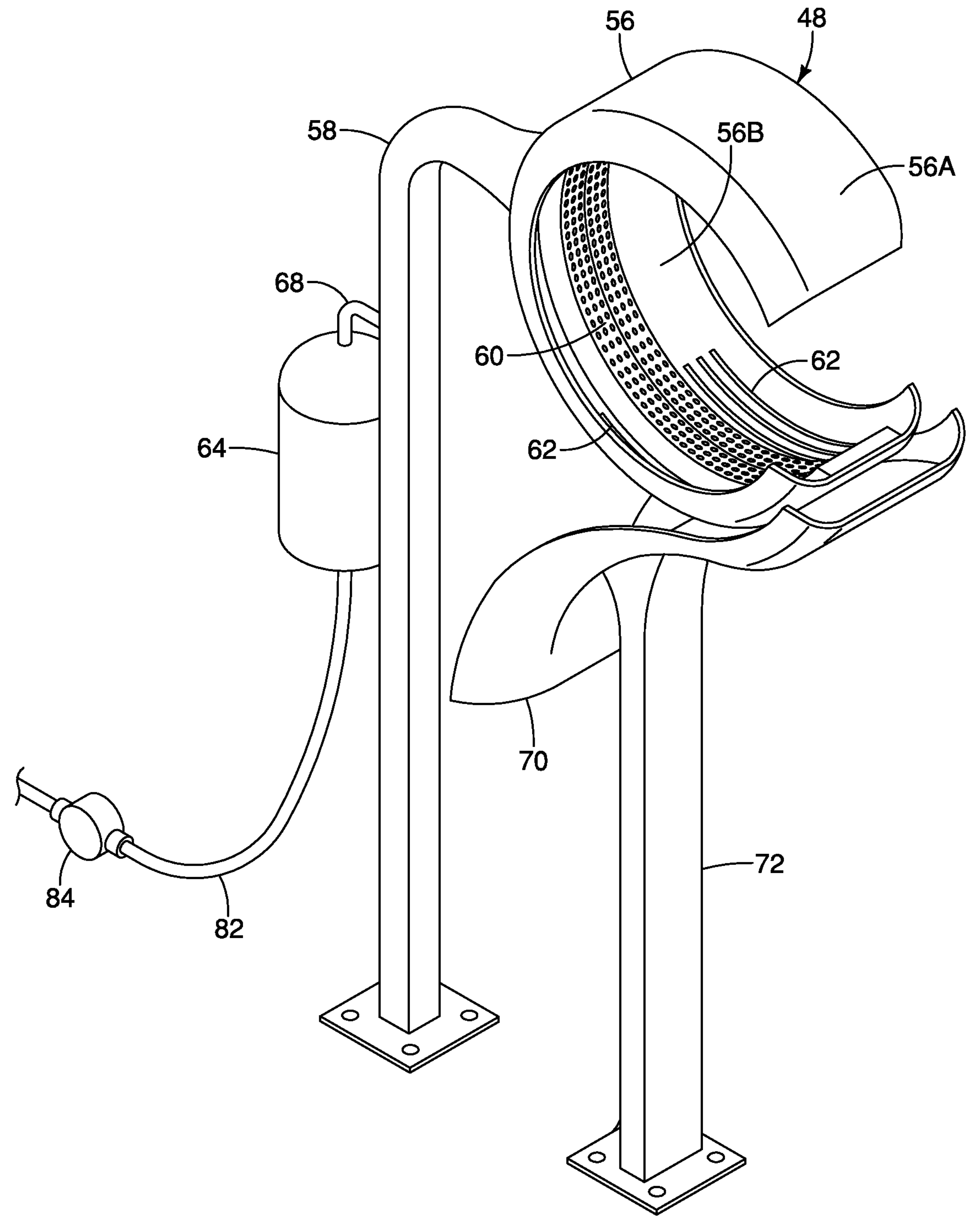
FIG. 5 is a perspective view of a first post-processing station of the three-dimensional printing system of FIG. 1.

The second post-processing station 48 includes a drain 62 configured to collect the liquid sprayed on the printed object by the plurality of nozzles 60, as shown in FIGS. 2, 4 and 5. The drain 62 extends from the inner surface 56B to the outer surface 56A of the substantially C-shaped frame 56 to remove liquid sprayed on the printed object 16. Preferably, a plurality of drains 62 are disposed on the inner surface 58B of the substantially C-shaped frame 56. The plurality of drains 62 preferably extend arcuately along a lower portion of the substantially C-shaped frame 56, although the drains can have any suitable shape, such as being substantially circular. The plurality of drains 62 are preferably disposed in the outer portions of the inner surface 56B, such that the plurality of nozzles 60 are disposed between the plurality of drains 62 in the printing direction D.

Figure 6:
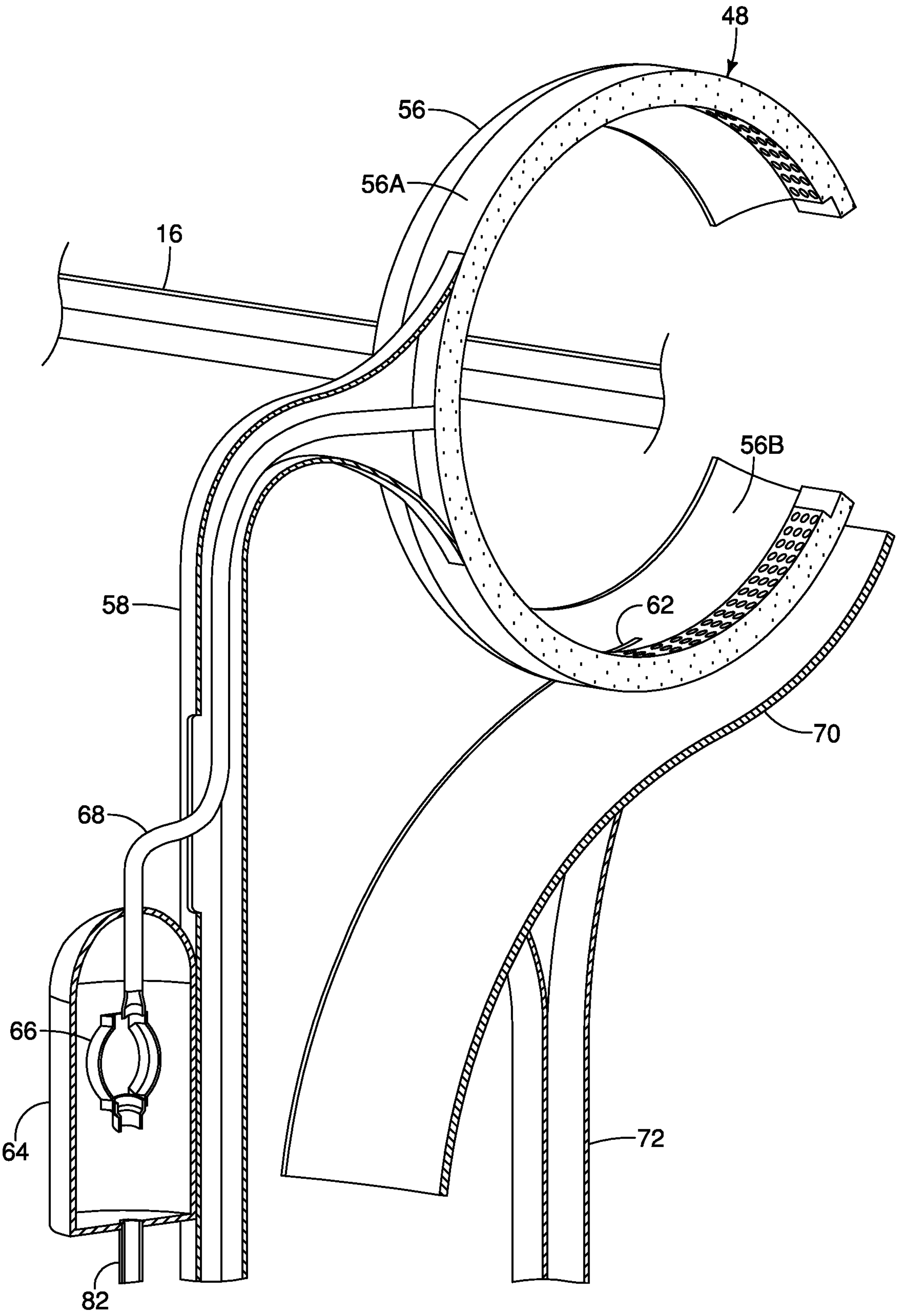
FIG. 6 is a perspective view in cross section of the first post-processing station of FIG. 5.

The second post-processing station 48 includes a reservoir 64 configured to store the liquid to be sprayed on the printed object, as shown in FIGS. 4-6. The reservoir 64 is connected to the stand 58, as shown in FIGS. 4-6. The stand 58 is configured to be secured to a floor or other suitable surface. The liquid can be any suitable liquid to wash the printed object 16, such as isopropyl alcohol. The plurality of nozzles 60 are fluidly connected to the reservoir 64. A pump 66 disposed in the reservoir 64 supplies the liquid from the reservoir 64 to the plurality of nozzles 60 through a liquid supply line 68.

A liquid collector 70 is disposed below the substantially C-shaped frame 56, as shown in FIGS. 4-6, to collect the waste liquid from the plurality of drains 62 in the substantially C-shaped frame 56. The liquid collector 70 is connected to a stand 72. The stand 72 is configured to be secured to a floor or other suitable surface. The liquid collector 70 can have any suitable shape configured to collect and supply the waste liquid to the distiller 74. The liquid collector 70 supplies the collected waste liquid to a distiller 74. As shown in FIG. 4, the liquid collector 70 is configured such that gravity supplies the collected waste liquid to the distiller 74. As shown in FIG. 4, the liquid collector 70 supplies the collected waste liquid to the distiller 74 through a funnel 76. The funnel 76 can include a filter to remove cured and uncured resin from the waste liquid. The collected liquid is distilled to remove cured and uncured liquid photopolymer resin from the collected liquid. The distiller 74 heats the collected waste liquid to form distilled liquid and hardened resin. The liquid in the waste liquid evaporates and condenses to form the distilled liquid, leaving behind the hardened resin. A pump 78 pumps the distilled liquid from the distiller 74 though a discharge line 80 for re-use. The discharge line 80 can be connected to a reservoir supply line 82 to supply the distilled liquid to the reservoir 64. The reservoir supply line 82 can include a pump 84 to facilitate supplying the liquid to the reservoir 64.

As shown in FIG. 1, the printed object 16 is supplied to the second-post processing station 48 to wash the printed object 16. The washed printed object is then passed through the first post-processing station 46 to post-cure the washed printed object. The printed object 16 can be passed through the post-processing station 44 while the object is still being formed in the tank 12, as shown in FIG. 1, such that a longer printed object can be formed. The pipe 30 supplies additional liquid photopolymer resin to the tank 10, as needed or continuously, to facilitate forming a longer printed object 16. The printed object 16 can be passed through additional pairs of rollers 86 to further facilitate guiding the printed object through the post-processing stations 44. Any suitable number of additional rollers 86 can be used. The first pair of rollers 42 are disposed upstream of the first post-processing station 46 and the second post-processing station 48 in the printing direction of the printed object 16. A second pair of rollers 86 is disposed downstream of the first processing station 46, as shown in FIG. 1. The additional pair of rollers 86 can be guide rollers. Alternatively, the additional pair of rollers includes a driven roller driven at a speed corresponding to the printing speed of the 3D printing system 10.

A separating device 88, such as a scraper, is disposed downstream of the post-curing stations 44 in the printing direction D of the printed object D, as shown in FIG. 1. The separating device 88 separates the printed object 16 from the print surface 14A of the rigid base 14. The printed object 16 can then be supplied to a spool to store the printed object. A monitor can be disposed downstream of the post-processing stations 44 to monitor any desired parameter of the printed object. The 3D printing system 10 illustrated in FIGS. 1-7 allows a longer object, such as an elastic door sealing strip for a vehicle, to be printed that is not limited by a travel distance of the rigid base 16 within the tank 12.

Figure 8:
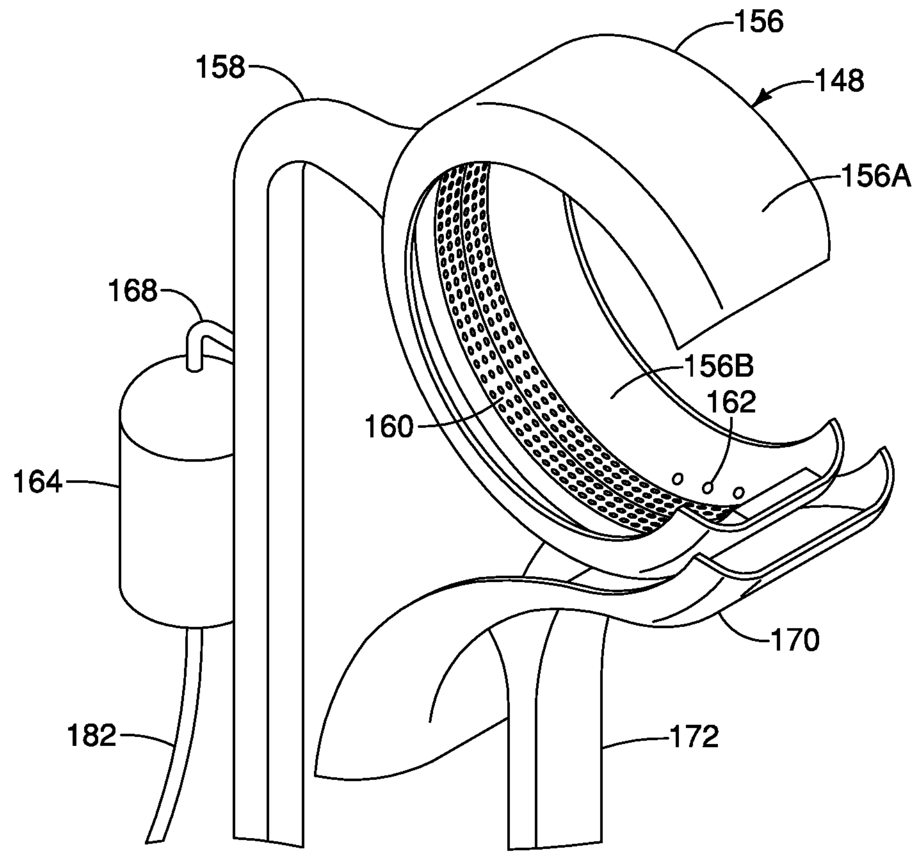
FIG. 8 is a perspective view of a first post-processing station in accordance with another exemplary embodiment.
Figure 9:
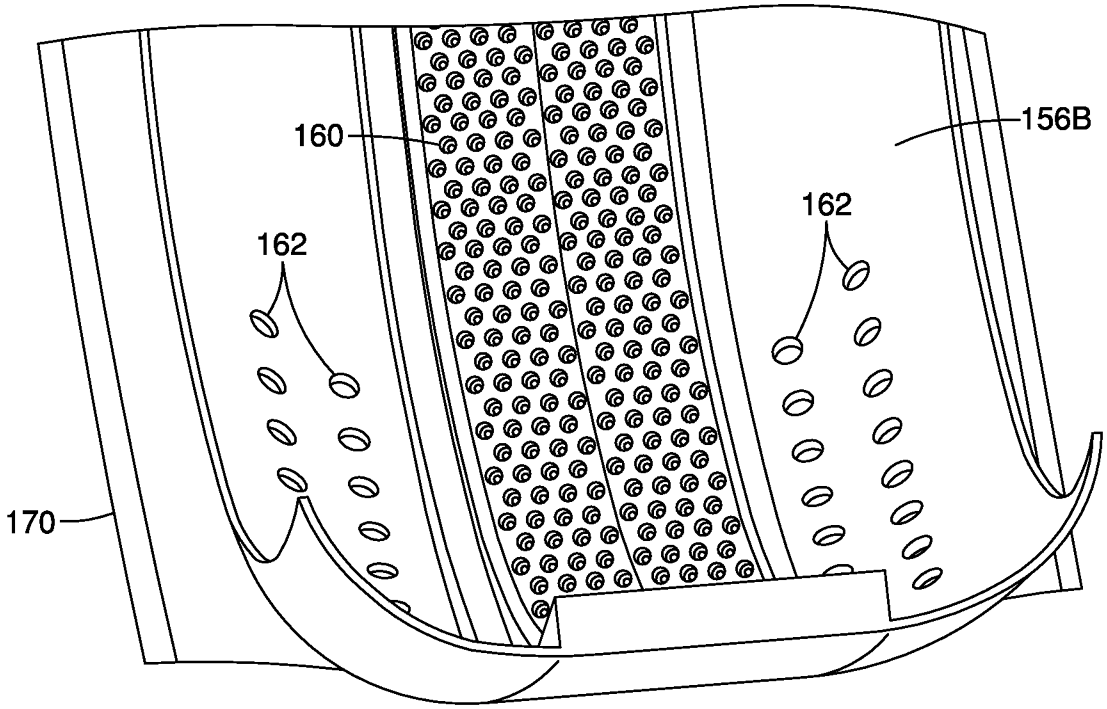
FIG. 9 is an enlarged perspective view of the first post-processing station of FIG. 8.

As shown in FIGS. 8-9, a second post-processing station 148 in accordance with another illustrated exemplary embodiment of the present invention is substantially similar to the second post-processing station 48 of the three-dimensional printing system 10 of the exemplary embodiment illustrated in FIGS. 1-7 except for the differences described below. Similar parts are identified with similar reference numerals, except increased by 100 (i.e., 1xx, accordingly).

The second post-processing station 148, as shown in FIGS. 8-9, is a post-washing station configured to wash the printed object 16 (FIG. 1) externally of the tank 12. The second post-processing station 148 includes a substantially C-shaped frame 156 connected to a stand 158. The stand 158 is configured to be secured to a floor or other suitable surface. The substantially C-shaped frame 156 includes an outer surface 156A and an inner surface 156B.

The second post-processing station 148 includes a nozzle 160 configured to dispense a liquid to the printed object 16, as shown in FIGS. 8-9. The nozzle 160 is disposed on the inner surface 156B of the substantially C-shaped frame 156. Preferably, a plurality of nozzles 160 are disposed on the inner surface 156B of the substantially C-shaped frame 156.

The inner surface 156B has a middle portion and two outer portions, each of which extends arcuately. The plurality of nozzles 160 are disposed in the middle portion of the inner surface 156B. Preferably, the plurality of nozzles 160 cover a majority of the middle portion of the inner surface 156B.

The second post-processing station 148 includes a drain 162 configured to collect the liquid sprayed on the printed object by the plurality of nozzles 160, as shown in FIGS. 8-9. Preferably, a plurality of drains 162 are disposed on the inner surface 158B of the substantially C-shaped frame 156. The plurality of drains 162 are substantially circular openings that extend from the inner surface 156B to the outer surface 156A of the substantially C-shaped frame 156, although the drains can have any suitable shape, such as being arcuate. The plurality of drains 162 are preferably disposed in the outer portions of the inner surface 156B, such that the plurality of nozzles 160 are disposed between the plurality of drains 162 in the printing direction of the object.

The second post-processing station 148 includes a reservoir 164 configured to store the liquid to be sprayed on the printed object, as shown in FIGS. 8-9. The reservoir 164 is connected to the stand 158. The stand 158 is configured to be secured to a floor or other suitable surface. The liquid can be any suitable liquid to wash the printed object 16, such as isopropyl alcohol. The plurality of nozzles 160 are fluidly connected to the reservoir 164. A pump 66 (FIG. 6) disposed in the reservoir 164 supplies the liquid from the reservoir 164 to the plurality of nozzles 160 through a liquid supply line 168. A reservoir supply line 182 supplies the liquid to the reservoir 164.

A liquid collector 170 is disposed below the substantially C-shaped frame 156, as shown in FIGS. 8-9, to collect the waste liquid from the plurality of drains 162 in the substantially C-shaped frame 156. The liquid collector 170 is connected to a stand 172. The stand 172 is configured to be secured to a floor or other suitable surface. The liquid collector 170 supplies the collected waste liquid to a distiller 74 (FIG. 4).

Figure 10:
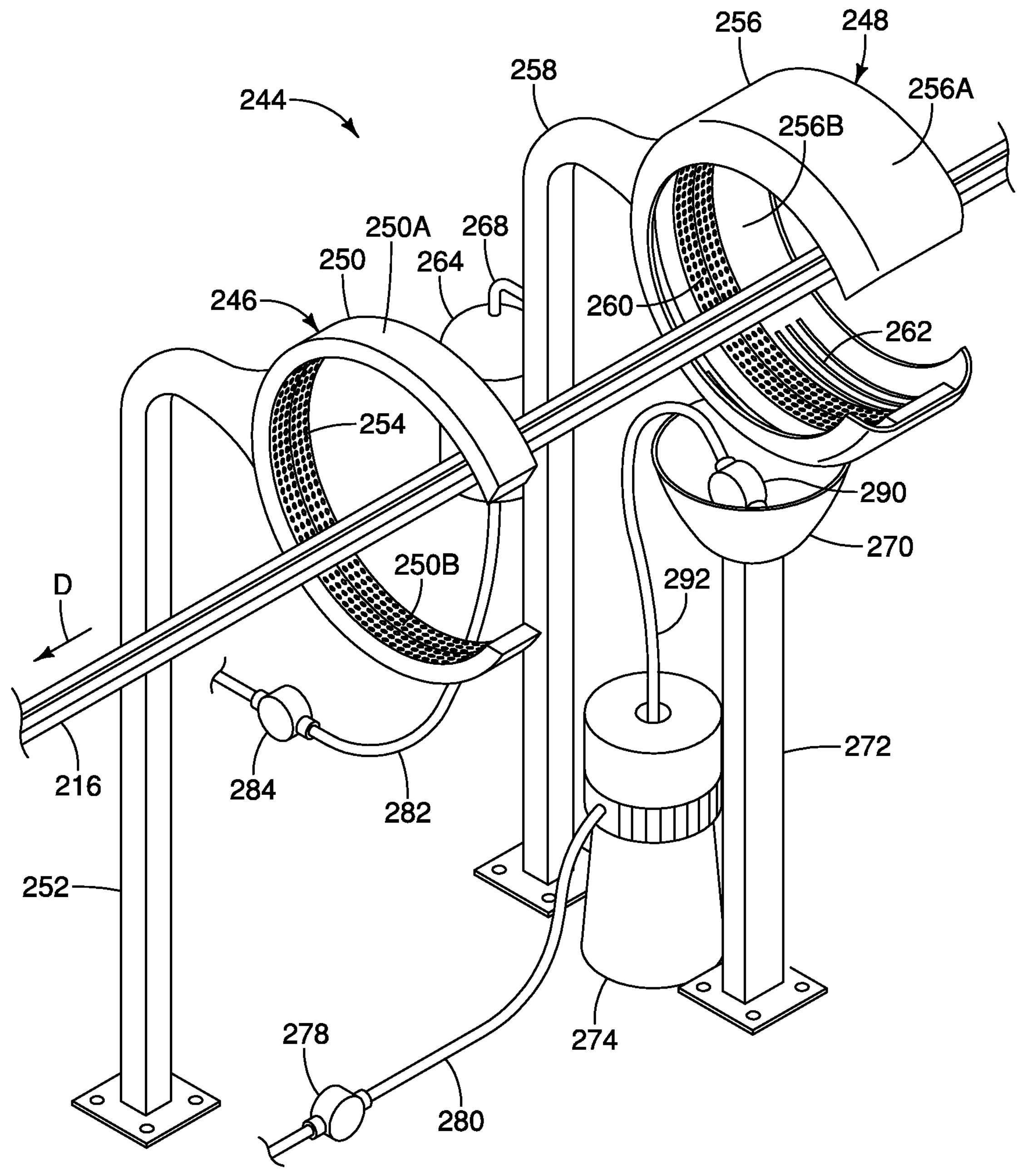
FIG. 10 is a perspective view of first and second post-processing stations in accordance with another exemplary embodiment.

As shown in FIG. 10, post-processing stations 244 in accordance with another illustrated exemplary embodiment of the present invention is substantially similar to the post-processing stations 44 of the three-dimensional printing system 10 of the exemplary embodiment illustrated in FIGS. 1-7 except for the differences described below. Similar parts are identified with similar reference numerals, except increased by 200 (i.e., 2xx, accordingly).

The printed object 216 is guided to the post-processing stations 244, as shown in FIG. 10. The post-processing stations 244 include a first post-processing station 246 and a second post-processing station 248. The post-processing stations 244 further process the printed object 216 after the printed object 216 is removed from the tank 12 (FIG. 1), such as washing and curing the printed object. The printed object 16 is configured to pass through the first post-processing station 246 and the second post-processing station 248 while the printed object 216 is still being formed in the tank 12 (FIG. 1). The first post-processing station 246 is preferably a curing station, and the second post-processing station 248 is preferably a washing station. The second post-processing station 246 is preferably disposed upstream of the first post-processing station 246 in the printing direction D of the printed object 216, although the post-processing stations can be disposed in any order and can include any desired number of post-processing stations, such as one or more post-processing stations.

The first post-processing station 246, as shown in FIG. 10, is a post-curing station configured to further cure the printed object 216 externally of the tank 12 (FIG. 1). Post-curing facilitates the polymerization process to ensure the resin of the printed object 216 is fully cured. The first post-processing station 246 includes a substantially C-shaped frame 250 connected to a stand 252. The stand 252 is configured to be secured to a floor or other suitable surface. The substantially C-shaped frame 250 includes an outer surface 25A and an inner surface 250B.

The first post-processing station 246 includes a second light source 254 configured to emit light to the printed object 216, as shown in FIG. 10. The second light source 254 is disposed on the inner surface 250B of the substantially C-shaped frame 250. A plurality of second light sources 254 can be disposed on the inner surface 250B of the substantially C-shaped frame 250. Preferably, the second light sources 254 cover a majority of the inner surface 250B of the substantially C-shaped frame 250. A power cable can be run through the stand 252 to supply power to the second light source 254. The second light source 254 can emit any suitable light, such as visible or UV light, to post-cure the printed object 216. The second light source 254 preferably emits UV light having a wavelength between approximately 10 and 400 nanometers, inclusive. Preferably, the emitted UV light by the second light source 254 has a wavelength between approximately 380 and 400 nanometers, inclusive. The second light source 254 can emit light having any suitable wavelength, such as, but not limited to, UV, visible and infrared light.

The second post-processing station 248, as shown in FIG. 10, is a post-washing station configured to wash the printed object 216 externally of the tank 12 (FIG. 1). Post-washing removes any uncured resin from the printed object 216. The second post-processing station 248 includes a substantially C-shaped frame 256 connected to a stand 258. The stand 258 is configured to be secured to a floor or other suitable surface. The substantially C-shaped frame 256 includes an outer surface 256A and an inner surface 256B.

The second post-processing station 248 includes a nozzle 260 configured to dispense a liquid to the printed object 216, as shown in FIG. 10. The nozzle 260 is disposed on the inner surface 256B of the substantially C-shaped frame 256. Preferably, a plurality of nozzles 260 are disposed on the inner surface 256B of the substantially C-shaped frame 256. The inner surface 256B has a middle portion and two outer portions, each of which extends arcuately. The plurality of nozzles 260 are disposed between the outer portions of the inner surface 256B in the print direction D. Preferably, the plurality of nozzles 260 cover a majority of the middle portion of the inner surface 256B.

The second post-processing station 248 includes a drain 262 configured to collect the liquid sprayed on the printed object by the plurality of nozzles 260, as shown in FIG. 10. The drain 262 extends from the inner surface 256B to the outer surface 256A of the substantially C-shaped frame 256. Preferably, a plurality of drains 262 are disposed on the inner surface 256B of the substantially C-shaped frame 256. The plurality of drains 262 preferably extend arcuately along a lower portion of the substantially C-shaped frame 256, although the drains can have any suitable shape, such as being substantially circular. The plurality of drains 262 are preferably disposed in the outer portions of the inner surface 256B, such that the plurality of nozzles 260 are disposed between the plurality of drains 262 in the print direction D.

The second post-processing station 248 includes a reservoir 264 configured to store the liquid to be sprayed on the printed object, as shown in FIG. 10. The reservoir 264 is connected to the stand 258. The stand 258 is configured to be secured to a floor or other suitable surface. The liquid can be any suitable liquid to wash the printed object 216, such as isopropyl alcohol. The plurality of nozzles 260 are fluidly connected to the reservoir 264. A pump 266 disposed in the reservoir 264 supplies the liquid from the reservoir 264 to the plurality of nozzles 260 through a liquid supply line 268.

A liquid collector 270 is disposed below the substantially C-shaped frame 256, as shown in FIG. 10, to collect the waste liquid from the plurality of drains 262 in the substantially C-shaped frame 256. The liquid collector 270 is connected to a stand 272. The stand 272 is configured to be secured to a floor or other suitable surface. The liquid collector 270 supplies the collected waste liquid to a distiller 274. The liquid collector 270 can have any suitable shape, such as a bowl. A pump 290 disposed in the liquid collector 270 pumps the collected waste liquid from the liquid collector 270 to the distiller 274 through a waste liquid line 292. The collected liquid in the distiller 274 is distilled to remove cured and uncured liquid photopolymer resin from the collected liquid. The distiller 274 heats the collected waste liquid to form distilled liquid and hardened resin. The liquid in the waste liquid evaporates and condenses to form the distilled liquid, leaving behind the hardened resin. A pump 278 pumps the distilled liquid from the distiller 274 though a discharge line 280 for re-use. The discharge line 280 can be connected to a reservoir supply line 282 to supply the distilled liquid to the reservoir 264. The reservoir supply line 282 can include a pump 284 to facilitate supplying the liquid to the reservoir 264.

Figure 11:
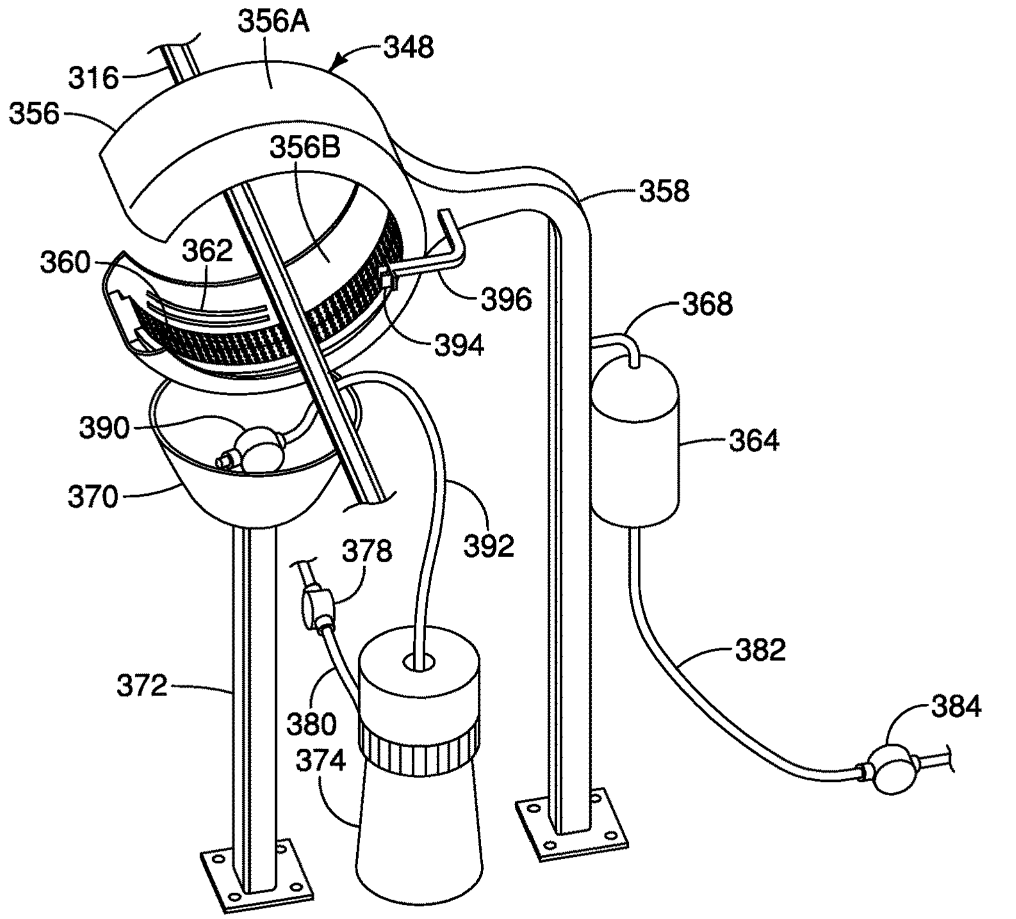
FIG. 11 is a perspective view of a first post-processing station including a sensor in accordance with another exemplary embodiment.
Figure 12:
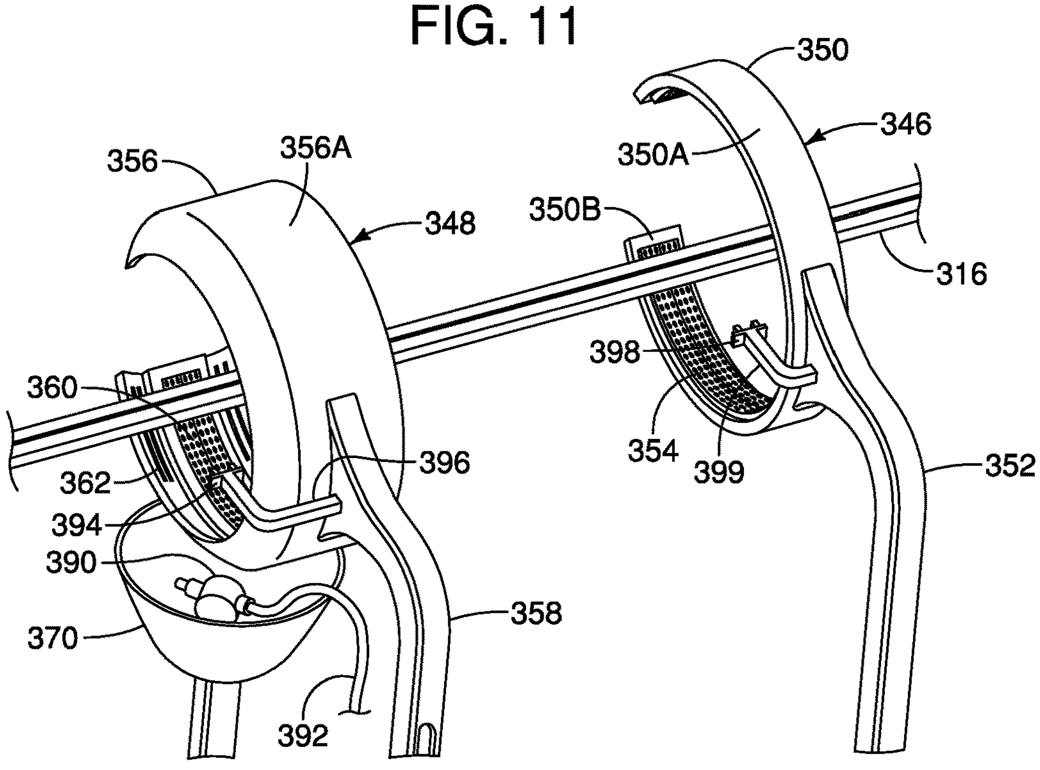
FIG. 12 is a rear perspective view of the first post-processing station of FIG. 11.
Figure 13:
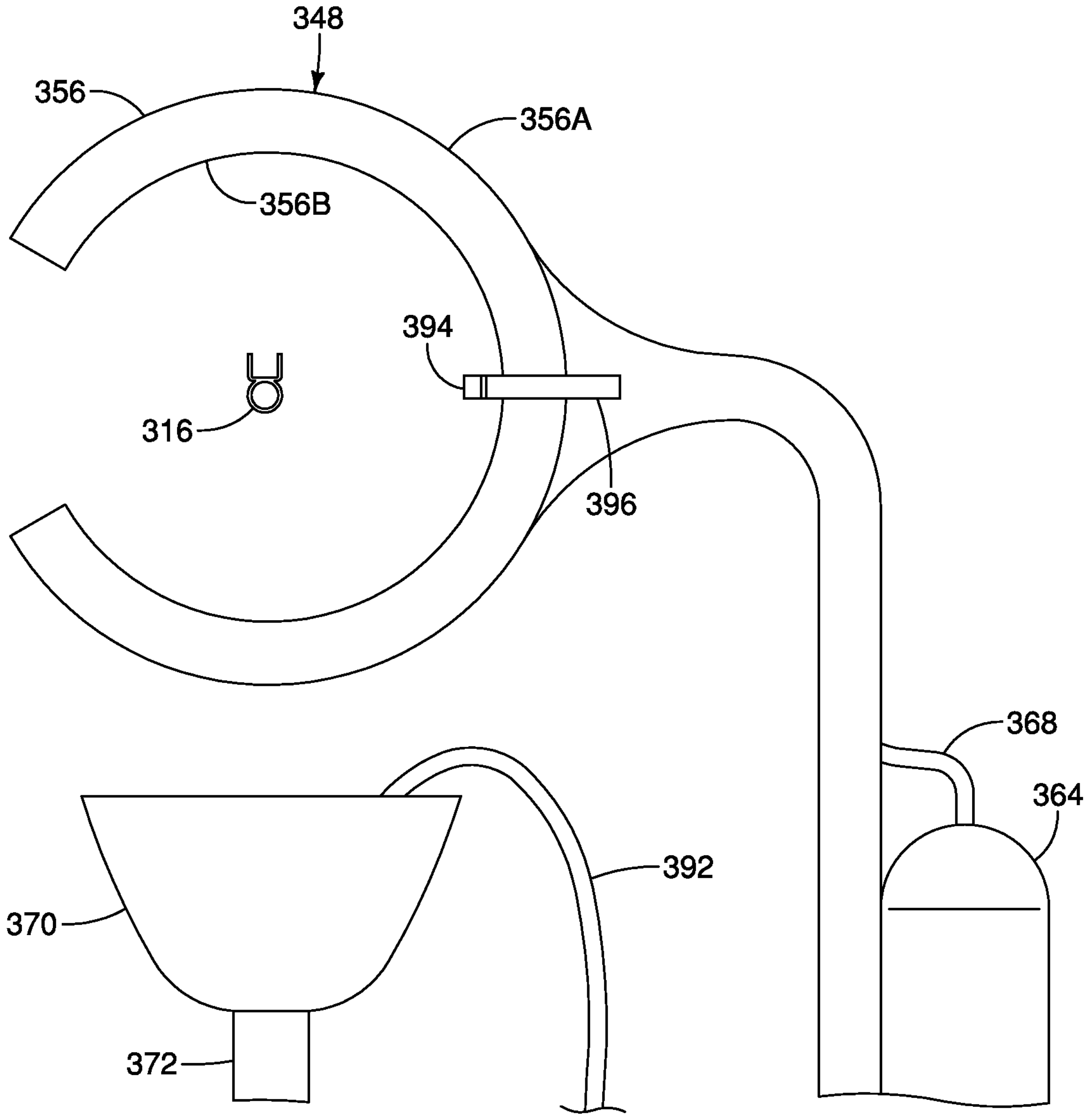
FIG. 13 is an elevational view of the first post-processing station of FIG. 11.

As shown in FIGS. 11-13, post-processing stations 344 in accordance with another illustrated exemplary embodiment of the present invention is substantially similar to the post-processing stations 44 of the three-dimensional printing system 10 of the exemplary embodiment illustrated in FIGS. 1-7 except for the differences described below. Similar parts are identified with similar reference numerals, except increased by 300 (i.e., 3xx, accordingly).

The printed object 316 is guided to the post-processing stations 344, as shown in FIGS. 11-13. The post-processing stations 344 include a first post-processing station 346 and a second post-processing station 348. The post-processing stations 344 further process the printed object 316 after the printed object 316 is removed from the tank 12 (FIG. 1), such as washing and curing the printed object. The printed object 316 is configured to pass through the first post-processing station 346 and the second post-processing station 348 while the printed object 316 is still being formed in the tank 12 (FIG. 1). The first post-processing station 346 is preferably a curing station, and the second post-processing station 348 is preferably a washing station. The second post-processing station 346 is preferably disposed upstream of the first post-processing station 346 in the printing direction D of the printed object 316, although the post-processing stations can be disposed in any order and can include any desired number of post-processing stations, such as one or more post-processing stations.

The first post-processing station 346, as shown in FIG. 12, is a post-curing station configured to further cure the printed object 316 externally of the tank 12 (FIG. 1). Post-curing facilitates the polymerization process to ensure the resin of the printed object 316 is fully cured. The first post-processing station 346 includes a substantially C-shaped frame 350 connected to a stand 352. The stand 352 is configured to be secured to a floor or other suitable surface. The substantially C-shaped frame 350 includes an outer surface 350A and an inner surface 350B.

The first post-processing station 346 includes a second light source 354 configured to emit light to the printed object 316, as shown in FIG. 12. The second light source 354 is disposed on the inner surface 350B of the substantially C-shaped frame 350. A plurality of second light sources 354 can be disposed on the inner surface 350B of the substantially C-shaped frame 350. Preferably, the second light sources 354 cover a majority of the inner surface 350B of the substantially C-shaped frame 350. A power cable can be run through the stand 352 to supply power to the second light source 354. The second light source 354 can emit any suitable light, such as visible or UV light, to post-cure the printed object 316. The second light source 354 preferably emits UV light having a wavelength between approximately 10 and 400 nanometers, inclusive. Preferably, the emitted UV light by the second light source 354 has a wavelength between approximately 380 and 400 nanometers, inclusive. The second light source 354 can emit light having any suitable wavelength, such as, but not limited to, UV, visible and infrared light.

The second post-processing station 348, as shown in FIGS. 11-13, is a post-washing station configured to wash the printed object 316 externally of the tank 12 (FIG. 1). Post-washing removes any uncured resin from the printed object 316. The second post-processing station 348 includes a substantially C-shaped frame 356 connected to a stand 358. The stand 358 is configured to be secured to a floor or other suitable surface. The substantially C-shaped frame 356 includes an outer surface 356A and an inner surface 356B.

The second post-processing station 348 includes a nozzle 360 configured to dispense a liquid to the printed object 316, as shown in FIGS. 11-13. The nozzle 360 is disposed on the inner surface 356B of the substantially C-shaped frame 356. Preferably, a plurality of nozzles 360 are disposed on the inner surface 356B of the substantially C-shaped frame 356. The inner surface 356B has a middle portion and two outer portions, each of which extends arcuately. The plurality of nozzles 360 are disposed between the outer portions of the inner surface 356B in the print direction D. Preferably, the plurality of nozzles 360 cover a majority of the middle portion of the inner surface 356B.

The second post-processing station 348 includes a drain 362 configured to collect the liquid sprayed on the printed object by the plurality of nozzles 360, as shown in FIGS. 11-12. The drain 362 extends from the inner surface 356B to the outer surface 356A of the substantially C-shaped frame 356. Preferably, a plurality of drains 362 are disposed on the inner surface 356B of the substantially C-shaped frame 356. The plurality of drains 362 preferably extend arcuately along a lower portion of the substantially C-shaped frame 356, although the drains can have any suitable shape, such as being substantially circular. The plurality of drains 362 are preferably disposed in the outer portions of the inner surface 356B, such that the plurality of nozzles 360 are disposed between the plurality of drains 362 in the print direction D.

The second post-processing station 348 includes a reservoir 364 configured to store the liquid to be sprayed on the printed object, as shown in FIGS. 11-13. The reservoir 364 is connected to the stand 358. The stand 358 is configured to be secured to a floor or other suitable surface. The liquid can be any suitable liquid to wash the printed object 316, such as isopropyl alcohol. The plurality of nozzles 360 are fluidly connected to the reservoir 364. A pump 66 (FIG. 6) disposed in the reservoir 364 supplies the liquid from the reservoir 364 to the plurality of nozzles 360 through a liquid supply line 368.

A liquid collector 370 is disposed below the substantially C-shaped frame 356, as shown in FIGS. 11-13, to collect the waste liquid from the plurality of drains 362 in the substantially C-shaped frame 356. The liquid collector 370 is connected to a stand 372. The stand 372 is configured to be secured to a floor or other suitable surface. The liquid collector 370 supplies the collected waste liquid to a distiller 374. The liquid collector 370 can have any suitable shape, such as a bowl. A pump 390 disposed in the liquid collector 370 pumps the collected waste liquid from the liquid collector 370 to the distiller 374 through a waste liquid line 392. The collected liquid in the distiller 374 is distilled to remove cured and uncured liquid photopolymer resin from the collected liquid. The distiller 374 heats the collected waste liquid to form distilled liquid and hardened resin. The liquid in the waste liquid evaporates and condenses to form the distilled liquid, leaving behind the hardened resin. A pump 378 pumps the distilled liquid from the distiller 374 though a discharge line 380 for re-use. The discharge line 380 can be fluidly connected to a reservoir supply line 382 to supply the distilled liquid to the reservoir 364. The reservoir supply line 382 can include a pump 384 to facilitate supplying the liquid to the reservoir 364.

A sensor 394 is connected to the second post-processing station 348, as shown in FIGS. 11-13. The sensor 394 is configured to detect the printed object 316 passing through the substantially C-shaped frame 356. The sensor 394 is disposed in any suitable position in which the printed object 316 can be detected. The sensor 394 is connected to the stand 358 by a substantially L-shaped mounting arm 396. The sensor 394 is disposed upstream of the second post-processing station 348 such that the sensor 394 can detect the printed object 316 before the printed object passes through the second post-processing station 348. Upon detecting the printed object 316, the sensor 394 transmits a signal to a controller (not shown) that is configured to control the plurality of nozzles 360 to spray the liquid on the printed object 316 passing through the second post-processing station 348. When the sensor 394 no longer detects the printed object 316, the sensor 394 transmits a signal to the controller causing the controller to stop the nozzles 360 from spraying the liquid.

A sensor 398 can be connected to the first post-processing station 346, as shown in FIG. 12. The sensor 398 is configured to detect the printed object 316 passing through the substantially C-shaped frame 350. The sensor 398 is disposed in any suitable position in which the printed object 316 can be detected. The sensor 398 is connected to the stand 352 by a substantially L-shaped mounting arm 399. The sensor 398 is disposed upstream of the first post-processing station 346 such that the sensor 398 can detect the printed object 316 before the printed object passes through the first post-processing station 346. Upon detecting the printed object 316, the sensor 398 transmits a signal to a controller (not shown) that is configured to control the plurality of second light sources 354 to emit light on the printed object 316 passing through the first post-processing station 346. When the sensor 398 no longer detects the printed object 316, the sensor 398 transmits a signal to the controller causing the controller to stop the second light sources 354 from emitting the light.

Alternatively, in lieu of providing the first post-processing station 346 with the sensor 398, the sensor 394 of the second post-processing station 348 transmits a signal to a controller controlling operation of the second light sources 354. Based on the printing speed of the printed object 316, the second light sources 354 can be controlled such that the second light sources 354 do not stop emitting light until the second end 16B (FIG. 1) of the printed object 316 has passed through the first post-processing station 346. Based on the printing speed of the printed object 316, the controller determines a time after the sensor 394 of the second post-processing station 348 does not detect the printed object 316 to stop the emission of light by the second light sources 354 of the first post-processing station 346.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the replenishment system for a three-dimensional printing system. Accordingly, these terms, as utilized to describe the present invention should be interpreted relative to a vehicle equipped with the replenishment system for a three-dimensional printing system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A three-dimensional printing system comprising:
a tank containing a liquid photopolymer resin;
a rigid base on which an object is configured to be printed;
an arm connected to the rigid base to move the rigid base relative to the tank;
a first light source configured to emit light to the tank to form the object on the rigid base;
a first pair of rollers configured to receive the object therebetween, the first pair of rollers being configured to pull the object in a direction out of the tank;
a first post-processing station configured to receive a first end of the object while a second end of the object is being formed in the tank, the first post-processing station including a second light source configured to emit light to the object; and
a second post-processing station configured to receive the first end of the object while the second end of the object is being formed in the tank, the second post-processing station being disposed upstream of the first post-processing station in a printing direction of the object, the second post-processing station including a reservoir configured to store a liquid to be sprayed on the object,
the second post-processing station including a C-shaped frame, a plurality of nozzles being disposed on an inner surface of the C-shaped frame, the plurality of nozzles being fluidly connected to the reservoir.

2. The three-dimensional printing system according to claim 1, wherein
the second post-processing station includes a drain configured to collect the liquid sprayed on the object.

3. The three-dimensional printing system according to claim 2, wherein
the collected liquid is distilled to remove cured and uncured liquid photopolymer resin from the collected liquid.

4. The three-dimensional printing system according to claim 3, wherein
the distilled liquid is supplied to the reservoir.

5. The three-dimensional printing system according to claim 1, wherein
a sensor is connected to the second post-processing station, the sensor being configured to detect the object prior to the object passing through the C-shaped frame.

6. The three-dimensional printing system according to claim 5, wherein
the plurality of nozzles are configured to spray the liquid on the object upon the sensor detecting the object.

7. A three-dimensional printing system comprising:
a tank containing a liquid photopolymer resin;
a rigid base on which an object is configured to be printed;
an arm connected to the rigid base to move the rigid base relative to the tank;
a first light source configured to emit light to the tank to form the object on the rigid base;
a first pair of rollers configured to receive the object therebetween, the first pair of rollers being configured to pull the object in a direction out of the tank;
a first post-processing station configured to receive a first end of the object while a second end of the object is being formed in the tank, the first post-processing station including a second light source configured to emit light to the object;
a second post-processing station configured to receive the first end of the object while the second end of the object is being formed in the tank, the second post-processing station being disposed upstream of the first post-processing station in a printing direction of the object, the second post-processing station including a C-shaped frame; and
a plurality of drains disposed on an inner surface of the C-shaped frame.

8. The three-dimensional printing system according to claim 1, wherein the liquid is isopropyl alcohol.

9. The three-dimensional printing system according to claim 1, wherein the first post-processing station includes a substantially C-shaped frame.

10. A three-dimensional printing system comprising:
a tank containing a liquid photopolymer resin;
a rigid base on which an object is configured to be printed;
an arm connected to the rigid base to move the rigid base relative to the tank;
a first light source configured to emit light to the tank to form the object on the rigid base;
a first pair of rollers configured to receive the object therebetween, the first pair of rollers being configured to pull the object in a direction out of the tank; and
a first post-processing station configured to receive a first end of the object while a second end of the object is being formed in the tank, the first post-processing station including a second light source configured to emit light to the object, the first post-processing station including a C-shaped frame;
the second light source being disposed on an inner surface of the C-shaped frame.

11. The three-dimensional printing system according to claim 10, wherein
a sensor is connected to the first post-processing station, the sensor being configured to detect the object prior to the object passing through the C-shaped frame.

12. The three-dimensional printing system according to claim 11, wherein
the second light source is configured to emit light to the object upon the sensor detecting the object.

13. The three-dimensional printing system according to claim 1, wherein the first pair of rollers is disposed upstream of the second post-processing station.

14. The three-dimensional printing system according to claim 11, wherein
a second pair of rollers is disposed downstream of the first post-processing station.

* * * * *